United States Patent
Zhang et al.

(10) Patent No.: US 11,540,327 B2
(45) Date of Patent: Dec. 27, 2022

(54) RANDOM ACCESS CHANNEL (RACH) TRANSMISSION WITH CROSS-BAND DOWNLINK/UPLINK (DL/UL) PAIRING

(71) Applicant: QUALCOMM INCORPORATED, San Diego, CA (US)

(72) Inventors: Xiaoxia Zhang, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 16/947,912

(22) Filed: Aug. 24, 2020

(65) Prior Publication Data

US 2020/0383146 A1 Dec. 3, 2020

Related U.S. Application Data

(63) Continuation of application No. 16/058,678, filed on Aug. 8, 2018, now Pat. No. 10,779,331.

(Continued)

(51) Int. Cl.
*H04W 74/08* (2009.01)
*H04W 52/18* (2009.01)
(Continued)

(52) U.S. Cl.
CPC ......... *H04W 74/0833* (2013.01); *H04L 41/08* (2013.01); *H04W 52/18* (2013.01);
(Continued)

(58) Field of Classification Search
CPC ...... H04L 41/08; H04W 16/14; H04W 52/18; H04W 52/50; H04W 72/0453; H04W 74/0833
(Continued)

(56) References Cited

U.S. PATENT DOCUMENTS 10,419,197 B2 * 9/2019 Montojo ............... H04L 5/0007
10,477,457 B2 * 11/2019 Park ..................... H04L 5/1469
(Continued)

FOREIGN PATENT DOCUMENTS

EP 2733873 A2 5/2014

OTHER PUBLICATIONS

Huawei, et al., "Overview of NR UL for LTE-NR Coexistence", 3GPP TSG RAN WG1 NR Ad Hoc Meeting, 3GPP Draft; R1-1709979, 3rd Generation Partnership Project (3GPP), Mobile Competence Centre; 650, Route Des Lucioles; F-06921 Sophia-Antipolis Cedex; France, vol. RAN WG1, No. Qingdao, China, Jun. 27, 2017-Jun. 30, 2017, Jun. 17, 2017 (Jun. 17, 2017), 12 Pages, XP051304719, Retrieved from the Internet: URL: http://www.3gpp.org/ftp/tsg_ran/WG1_RL1/TSGR1_AH/NR_AH_1706/Docs/, Sections 2.1, 2.2.4.1; pp. 2,6.

(Continued)

*Primary Examiner* — Robert J Lopata
(74) *Attorney, Agent, or Firm* — Liem T. Do

(57) ABSTRACT

Wireless communications systems and methods related to performing random channel access are provided. A first wireless communication device communicates a random access configuration with a second wireless communication device in a first frequency spectrum. The random access configuration includes information associated with a channel characteristic difference between the first frequency spectrum and the second frequency spectrum. The first wireless communication device communicates a random access signal with the second wireless communication device in the second frequency spectrum based on the random access configuration. The first frequency spectrum is a millimeter wave (mmWav) frequency band. The second frequency spectrum is a non-mmWav frequency band.

20 Claims, 10 Drawing Sheets

Related U.S. Application Data

(60) Provisional application No. 62/548,204, filed on Aug. 21, 2017.

(51) Int. Cl.
  *H04L 41/08* (2022.01)
  *H04W 52/50* (2009.01)
  *H04W 72/04* (2009.01)
  *H04W 16/14* (2009.01)

(52) U.S. Cl.
  CPC ............ *H04W 52/50* (2013.01); *H04W 16/14* (2013.01); *H04W 72/0453* (2013.01)

(58) Field of Classification Search
  USPC ......................................................... 370/329
  See application file for complete search history.

(56) References Cited

U.S. PATENT DOCUMENTS

| | | | | |
|---|---|---|---|---|
| 2005/0181811 | A1* | 8/2005 | Magnusson | H04W 52/50 455/458 |
| 2014/0016622 | A1* | 1/2014 | Bao | H04L 5/001 370/336 |
| 2016/0254950 | A1* | 9/2016 | Lim | H04W 12/08 709/220 |
| 2017/0006518 | A1* | 1/2017 | Xing | H04W 36/38 |
| 2017/0099175 | A1* | 4/2017 | Tian | H04W 72/042 |
| 2017/0105233 | A1* | 4/2017 | Zhang | H04W 16/14 |
| 2017/0195033 | A1* | 7/2017 | Zhang | H04B 17/309 |
| 2018/0084550 | A1* | 3/2018 | Chen | H04W 72/0453 |
| 2018/0102824 | A1* | 4/2018 | Jitsukawa | H04L 25/0224 |
| 2018/0317067 | A1* | 11/2018 | Ameixieira | H04W 4/46 |
| 2019/0053080 | A1* | 2/2019 | Ryu | H04W 24/08 |
| 2019/0059110 | A1* | 2/2019 | Zhang | H04W 16/14 |
| 2019/0059111 | A1 | 2/2019 | Zhang et al. | |
| 2019/0090277 | A1* | 3/2019 | Yi | H04W 28/0268 |
| 2019/0123948 | A1* | 4/2019 | Zhao | H04L 27/2636 |
| 2019/0208549 | A1* | 7/2019 | Zhang | H04W 16/14 |
| 2019/0239123 | A1* | 8/2019 | Kim | H04W 88/023 |
| 2019/0288760 | A1* | 9/2019 | Li | H04B 7/0632 |
| 2019/0296868 | A1* | 9/2019 | Zhang | H04L 5/0048 |
| 2019/0349864 | A1* | 11/2019 | Zhang | H04B 7/088 |
| 2019/0357264 | A1* | 11/2019 | Yi | H04L 5/001 |
| 2020/0077451 | A1* | 3/2020 | You | H04W 72/0453 |

OTHER PUBLICATIONS

Huawei H., et al., "Considerations of NR UL Operation for LTE-NR Coexistence," 3GPP Draft, 3GPP TSG RAN WG1 Meeting #88bis, R1-1704199, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Mar. 25, 2017, XP051251008, 7 pages, Retrieved from the Internet: URL: http://www.3gpp.org/ftp/tsg_ran/WG1_RL1/TSGR1_88b/Docs/ [retrieved on Mar. 25, 2017].

International Search Report and Written Opinion—PCT/US2018/046031—ISA/EPO—dated Nov. 16, 2018.

International Preliminary Report on Patentability—PCT/US2018/046031 The International Bureau of WIPO—Geneva, Switzerland, Mar. 5, 2020.

Samsung: "Random Access Procedure in NR", 3GPP TSG-RAN WG2 #96, 3GPP Draft, R2-167568, Random Access Procedure in NR, 3rd Generation Partnership Project (3GPP), Mobile Competence Centre; 650, Route Des Lucioles; F-06921 Sophia-Antipolis Cedex, France, vol. RAN WG2, Reno. USA; Nov. 14, 2016-Nov. 18, 2016, Nov. 13, 2016 (Nov. 13, 2016), XP051177436, 7 pages, Retrieved from the Internet: URL: http://www.3gpp.org/ftp/Meetings_3GPP_SYNC/RAN2/Docs/ [retrieved on Nov. 13, 2016], Paragraph [02.1], Paragraph [02.2].

Huawei, et al., "UL Power Control for SUL and LTE-NR Uplink Coexistence with UL Sharing", 3GPP Draft, 3GPP TSG RAN WG1 Meeting #90, R1-1712164, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017, XP051314983, 5 Pages, Retrieved from the Internet: URL: http://www.3gpp.org/ftp/Meetings_3GPP_SYNC/RAN1/Docs/ [retrieved on Aug. 20, 2017].

\* cited by examiner

RANDOM ACCESS CHANNEL (RACH) TRANSMISSION WITH CROSS-BAND DOWNLINK/UPLINK (DL/UL) PAIRING

CROSS REFERENCE TO RELATED APPLICATIONS

The present application is a continuation application of U.S. Non-Provisional patent application Ser. No. 16/058,678 filed Aug. 8, 2018, which claims priority to and the benefit of the U.S. Provisional Patent Application No. 62/548,204, filed Aug. 21, 2017, each of which is hereby incorporated by reference in its entirety as if fully set forth below and for all applicable purposes.

TECHNICAL FIELD

This application relates to wireless communication systems and methods, and more particularly to performing a random access procedure in a network that employs a millimeter wave (mmWav) band for downlink (DL) communications and a non-mmWav band for uplink (UL) communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE). The communication direction from a BS to a UE is referred to as DL. The communication direction from a UE to a BS is referred to as UL. To meet the growing demands for expanded mobile broadband connectivity, wireless communication technologies are advancing from the LTE technology to a next generation new radio (NR) technology. One technique for expanding connectivity may be to extend the frequency operation range to higher frequencies since lower frequencies are becoming over-crowded. For example, mmWav frequency bands between about 30 gigahertz (GHz) to about 300 GHz can provide a large bandwidth for high data rate communications. However, transmissions in the mmWav frequencies may have potential health impacts to human bodies. One approach to avoiding or minimizing the effects of mmWav to human bodies may be to use mmWav frequencies for DL communications, but continue to use low frequencies (e.g., at sub-6 GHz) for UL communications. As such, UL transmissions, which may typically originate from a UE located close to a user, may remain in the low frequencies. In addition, the pairing of a DL mmWav band with a UL sub-6 GHz band can minimize implementation complexity at the UEs. While the pairing of a DL mmWav band with a UL sub-6 GHz band can improve connectivity, the different channel characteristics between a mmWav band and a sub-6 GHz band can be cause challenges for initial network access.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a random access configuration including information associated with a channel characteristic difference between a first frequency spectrum and a second frequency spectrum, the random access configuration communicated in the first frequency spectrum; and communicating, by the first wireless communication device with the second wireless communication device, a random access signal in the second frequency spectrum based on the random access configuration.

In an additional aspect of the disclosure, an apparatus including a transceiver configured to communicate, with a second wireless communication device, a random access configuration including information associated with a channel characteristic difference between a first frequency spectrum and a second frequency spectrum, the random access configuration communicated in the first frequency spectrum; and communicate, with the second wireless communication device, a random access signal in the second frequency spectrum based on the random access configuration.

In an additional aspect of the disclosure, a computer-readable medium having program code recorded thereon, the program code includes code for causing a first wireless communication device to communicate, with a second wireless communication device, a random access configuration including information associated with a channel characteristic difference between a first frequency spectrum and a second frequency spectrum, the random access configuration communicated in the first frequency spectrum; and code for causing the first wireless communication device to communicate, with the second wireless communication device, a random access signal in the second frequency spectrum based on the random access configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
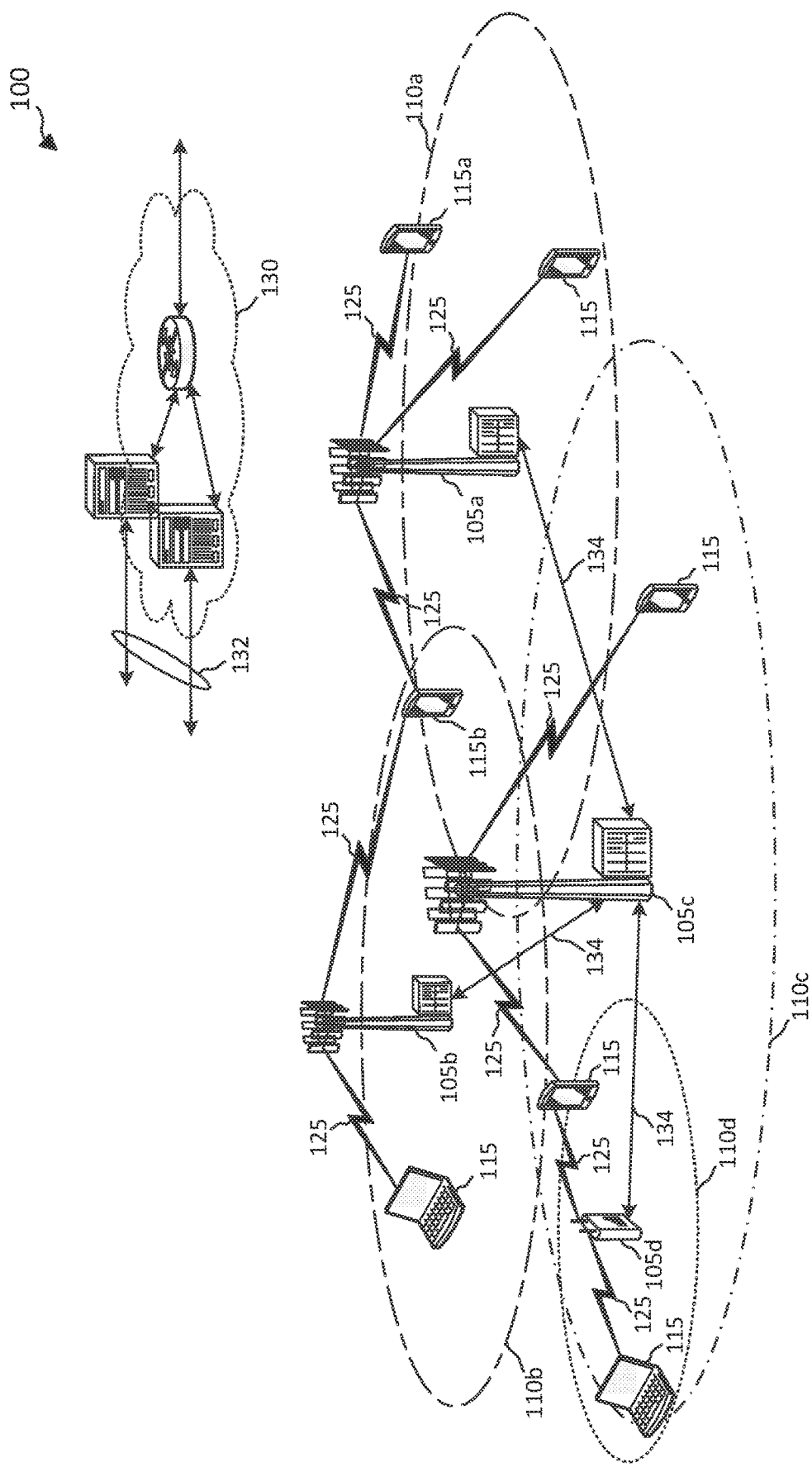
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWave bands) network.

To facilitate synchronization in a network, a base station (BS) may broadcast synchronization signal blocks (SSBs) periodically in the network. The SSBs may include synchronization signals, system information signals, and/or other reference signals. A UE may listen to the network and synchronizes to the BS based on the SSBs. The UE may initiate a network access by transmitting a random access request signal in a random access channel (RACH). In some instances, the RACH may be a contention-based RACH, where multiple users or UEs may access the same resource. The random access request signal may include a predetermined preamble. The UE may perform open loop power control to determine a transmission power level for transmitting the random access request signal. For example, the BS may broadcast a transmission power level used for SSB transmissions and an initial target random access reception power desired at the BS. Thus, the UE may estimate a path loss in the DL channel based on a reception power of the SSBs measured at the UE and the SSB transmission power level indicated in the SSBs. The UE may determine the transmission power level based on the DL path loss and the initial target random access reception power.

In a network where a DL frequency band and a UL frequency band have similar channel characteristics, the DL path loss may be similar to the UL path loss. Thus, the determination of an initial random access transmission power level based on the DL path loss may provide a sufficiently good performance. However, when a network pairs a DL mmWav band with a UL sub-6 GHz band, where the DL path loss may be significantly different from the UL path loss, the determination of an initial random access transmission power level based on the DL path loss may not provide a good performance.

The present application describes mechanisms for performing a random access procedure in a network with cross-band DL/UL pairing. For example, a network may employ a mmWav band for DL communications and a UL non-mmWav band, such as a sub-6 GHz band, for UL communications. The disclosed embodiments consider the different channel characteristics between the DL mmWav band and the UL non-mmWav band for random access power control. For example, the disclosed embodiments may consider the different path loss and/or the different penetration loss between the DL mmWav band and the UL non-mmWav band and/or the different antenna array gains or compensations that a BS may apply to communications in the DL mmWav band and the UL non-mmWav band.

In an embodiment, a BS may determine an initial target random access reception power desired at the BS. The BS may apply an adjustment to the initial target random access reception power to account for the different channel characteristics between the DL mmWav band and the UL non-mmWav band. The BS may indicate the initial target random access reception power including the adjustment in a DL broadcast signal (e.g., an SSB). Thus, the channel characteristic difference or the adjustment may be transparent to a UE.

In another embodiment, the BS may indicate an initial target random access reception power desired at the BS without the adjustment in a DL broadcast signal (e.g., an SSB). In addition, the BS may indicate adjustment parameters in the DL broadcast signal to enable the UE to account for the different channel characteristics between the DL mmWav band and the UL non-mmWav band during a random access transmission power level determination.

In yet another embodiment, the BS may additionally transmit low-duty cycle measurement signals in the UL non-mmWav band to enable the UE to estimate channel characteristics in the UL non-mmWav band. The BS may indicate the transmission power level of the measurement signals. Thus, the UE may listen to the network in the DL mmWav band and in the UL non-mmWav band. For example, the UE may receive the transmission power level of the measurement signals from the DL mmWav band and the measurement signals from the UL non-mmWav band. The UE may determine a random access transmission power level based on a path loss estimated from the measurement signal. In some embodiments, the measurement signals may include SSBs or other suitable reference signals. In some embodiments, the BS may transmit the measurement signals in the UL non-mmWav band based on frequency-division multiplexing (FDM) or time-division multiplexing (TDM) with UL signals.

Aspects of the present application can provide several benefits. For example, the inclusion of the adjustment at the BS or the indication of the adjustment parameters to the UE allows the UE to determine a more suitable or random access transmission power in a network with cross-band DL/UL pairing, and thus may improve random access performance. The additional measurement signal transmissions in the UL non-mmWav band allows the UE to obtain a more accurate estimate of channel characteristics in the UL non-mmWav band, and thus may further improve random access performance. While the disclosed embodiments are described in the context of a network deployed over a DL mmWav band and a UL non-mmWav band, the disclosed embodiments can be applied to a network deployed over any pair of DL/UL bands with significantly different channel characteristics. For example, the DL band may be located at significantly higher frequencies than the UL band.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1,X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105. In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may employ cross-band DL/UL pairing to improve data throughput. For example, the network 100 may employ a high-frequency mmWav band for DL communications and a low-frequency non-mmWav band in sub-6 GHz frequencies for UL communications. For example, the DL mmWav band may have a significantly higher path loss than the UL non-mmWav band. To overcome the high path loss, the BSs 105 may employ beamforming (e.g., analog and/or digital beamforming) to generate narrow beams directing towards certain directions for DL communications with the UEs 115. To facilitate initial channel access power control at the UEs 115, the BSs 105 may provide information related to channel characteristics of the DL mmWav band and the UL non-mmWav band, as described in greater detail herein.

Figure 2:
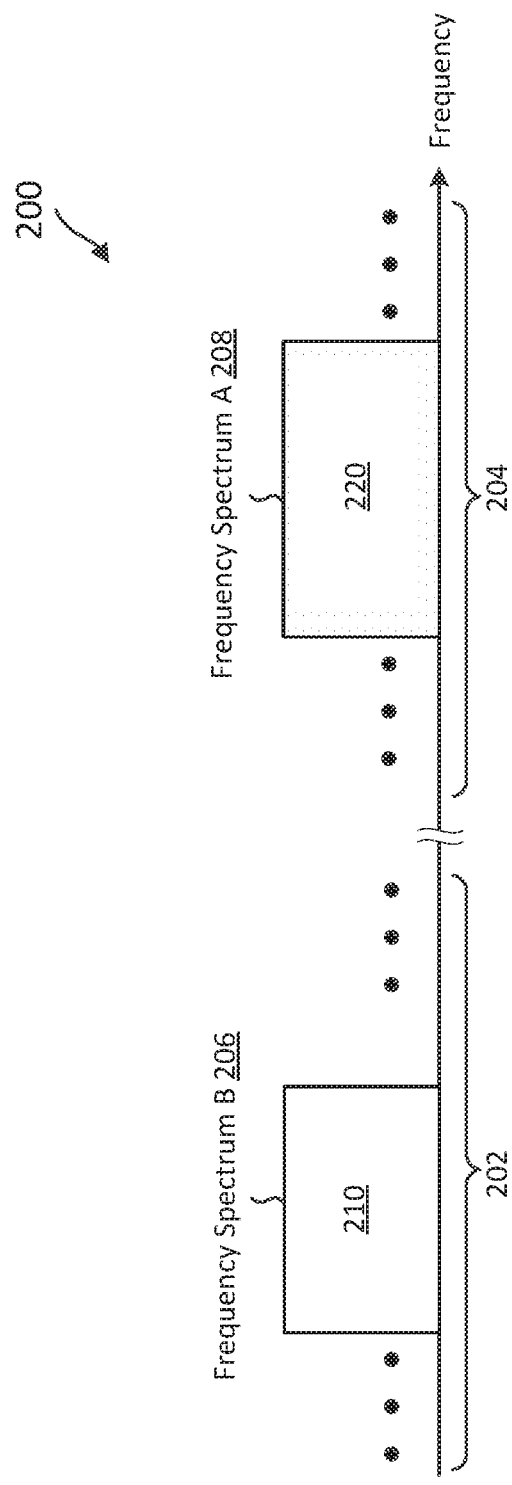
FIG. 2 illustrates a cross-band downlink/uplink (DL/UL) pairing scenario according to embodiments of the present disclosure.

FIG. 2 illustrates a cross-band DL/UL pairing scenario 200 according to embodiments of the present disclosure. In FIG. 2, the x-axis represents frequency in some constant units. The scenario 200 may correspond to a communication scenario between a BS 105 and a UE 115 in the network 100. The scenario 200 includes a frequency spectrum B 206 and a frequency spectrum A 208. The frequency spectrum A 208 is located in a mmWav frequency band 204, for example, at frequencies above 10 GHz. The frequency spectrum B 206 is located in a low-frequency nom-mmWav frequency band 202, for example, at sub-6 GHz frequencies. The spectrum A 208 may be used for DL communications 220. For example, a BS 105 may send a DL communication signal to a UE 115 in the spectrum A 208. The spectrum B 206 may be used for UL communications 210. For example, a UE 115 may send a UL communication signal to a BS 105 in the spectrum B 206. The DL channel path or channel response in the frequency spectrum A 208 may significantly differ from the UL channel path or channel response in the frequency spectrum B 206. For example, the path loss and/or the penetration loss may be higher in frequency spectrum A 208 than in the frequency spectrum B 206 due to the high frequencies. In addition, the BS 105 may employ different antenna array gains or compensations for the DL communications 220 in the frequency spectrum A 208 and the UL communications 210 in the frequency spectrum B 206.

Figure 3:
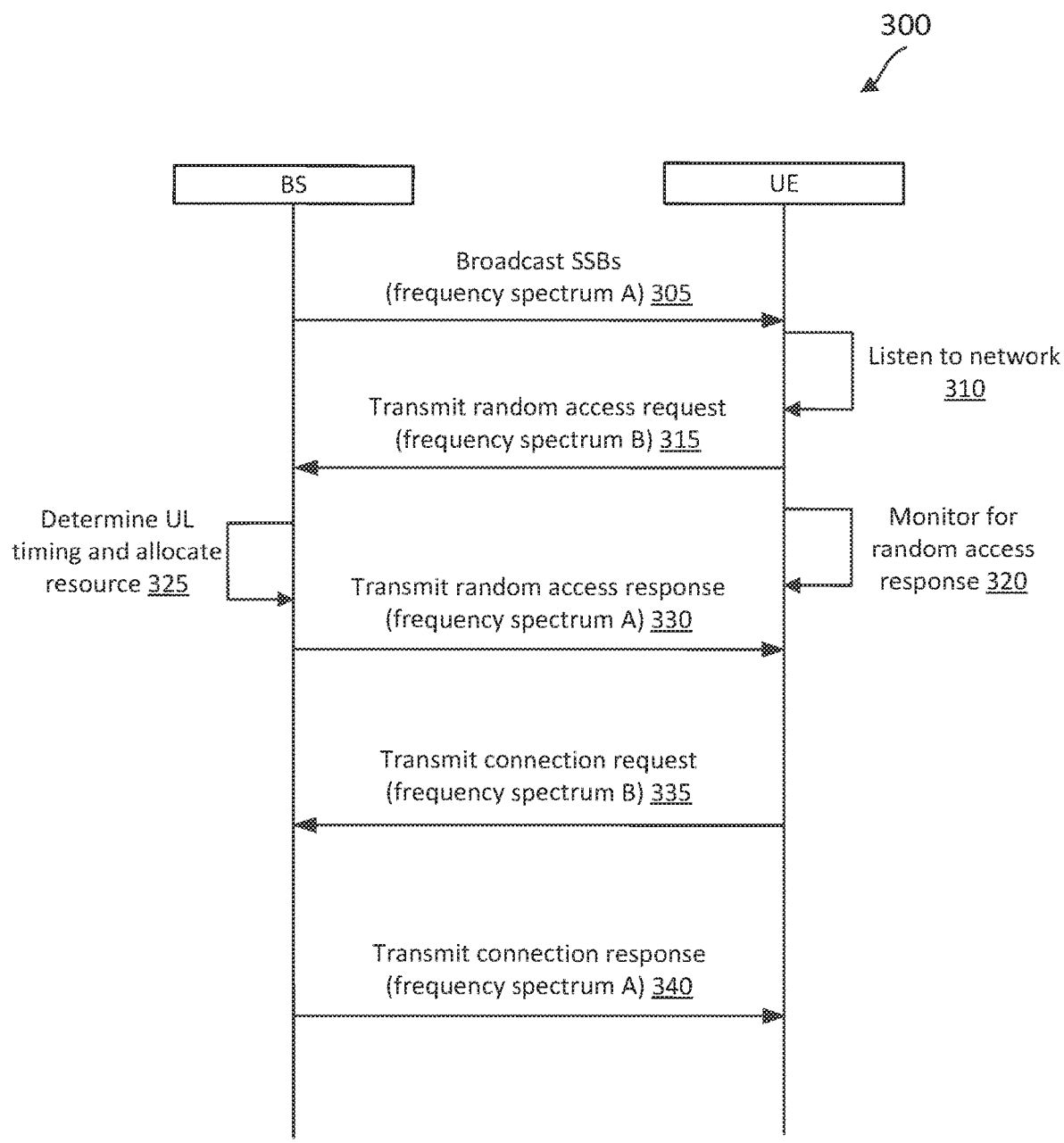
FIG. 3 illustrates a signaling diagram of a random access method in a network using cross-band DL/UL pairing according to embodiments of the present disclosure.

FIG. 3 illustrates a signaling diagram of a random access method 300 in a network using cross-band DL/UL pairing according to embodiments of the present disclosure. The network may be similar to the network 100 and employ cross-band DL/UL pairing as shown in the scenario 200. The method 300 is implemented between a BS such as the BS 105 and a UE such as the UE 115 during an initial channel access. As illustrated, the method 300 includes a number of enumerated steps, but embodiments of the method 300 may include additional steps before, after, and in between the enumerated steps. In some embodiments, one or more of the enumerated steps may be omitted or performed in a different order. The method 300 illustrates one BS and one UE for purposes of simplicity of discussion, though it will be recognized that embodiments of the present disclosure may scale to many more UEs and/or BSs.

At step 305, the BS broadcasts SSBs in a frequency spectrum A (e.g., the mmWav frequency spectrum A 208). The BS may transmit the SSBs using multiple narrow beams in multiple beam directions, for example, by employing analog and/or digital beamforming. The BS may transmit the SSBs repeatedly at a predetermined periodicity. The SSBs may include PSSs, SSSs, PBCH signals, and/or any reference signal that may facilitate cell or channel synchronization at the UE. A PSS or an SSS may include a predetermined sequence for channel synchronization. A PBCH signal may carry cell access related information, channel configuration information, SSB configuration information, physical random access channel (PRACH) configuration information, and/or neighboring cell information. The channel configuration information may include bandwidths, frequency bands (e.g., the frequency spectrums 206 and 208), and/or numerologies (e.g., subcarrier spacing) for UL and DL communications. The SSB configuration information may indicate SSB periodicities and/or an SSB transmission power level. The PRACH configuration information may indicate sequences, formats, resources, an initial target random access reception power level at the BS, and/or other information for random access preamble transmissions.

At step 310, the UE listens to the network for SSBs. The UE may receive multiple SSBs from the BS in one or more beam directions. The UE may determine reception powers of the received SSBs and select a preferred SSB or beam direction based on the reception powers. For example, the UE may select the SSB with the maximum reception power. The UE may determine a path loss in the frequency spectrum A based on the determined reception power and the SSB transmission power level broadcast in the SSB configuration information. The UE may determine an initial random access transmission power level based on the determined path loss and the initial target random access reception power level. However, the frequency spectrum A and the frequency spectrum B may have different channel characteristics (e.g., path loss) due to the different frequency ranges. Thus, the BS and/or the UE may need to account for the channel characteristic difference, as described in greater detail herein.

At step 315, the UE transmits a random access request in a frequency spectrum B (e.g., the low-frequency non-mm-Wav frequency spectrum B 206). The UE may generate a random access preamble according to the PRACH configuration information (e.g., the sequence and format information). The UE may transmit the random access request in the form of a signal carrying the random access preamble. The UE may transmit the random access request using the determined random access transmission power level.

At step 320, after transmitting the random access request, the UE monitors for a random access response from the BS in the frequency spectrum A, for example, during a random access response window.

At step 325, upon detecting the random access request, the BS determines the UL transmission timing associated with the UE and assigns a resource in the frequency B to the UE.

At step 330, the BS transmits a random access response to the UE in the frequency spectrum A, for example, using a narrow beam. The random access response may include UL timing adjustment information, the allocation of the resource in the frequency spectrum B, and any other information (e.g., a temporary identifier for the UE) for subsequent connection establishment.

At step 335, upon receiving the random access response, the UE transmits a connection request according to the random access response, for example, using the assigned resource in the frequency spectrum B.

At step 340, upon receiving the connection request, the BS may respond by transmitting a connection response in the frequency spectrum A. The connection response may provide configuration information specific to the UE.

In some embodiments, the random access request and the connection request transmitted in the frequency spectrum B may use one subcarrier spacing and the random access response and the connection response transmitted in the frequency spectrum A may use another subcarrier spacing. The start and/or end of random access response window used for random access response monitoring in the step 320 may be defined based on the UL subcarrier spacing in the frequency spectrum B or may be defined using a time duration (e.g., in milliseconds (ms) or seconds). In some embodiments, the random access request, the random, access response, the connection request, and the connection response may be referred to as message 1, message 2, message 3, and message 4, respectively.

Figure 4:
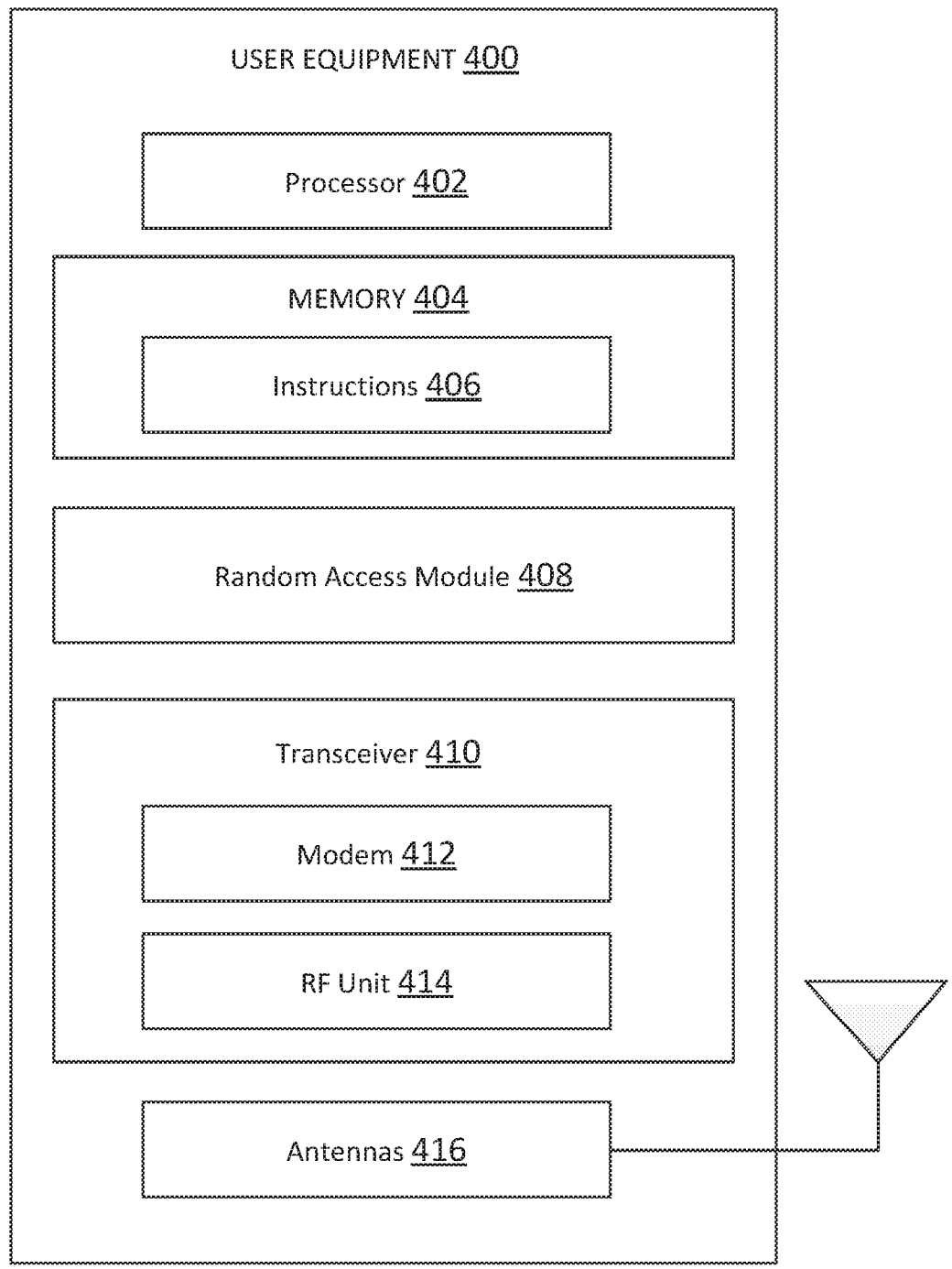
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a random access module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc.

"Instructions" and "code" may include a single computer-readable statement or many computer-readable statements.

The random access module 408 may be implemented via hardware, software, or combinations thereof. For example, the random access module 408 may be implemented as a processor, circuit, and/or instructions 406 stored in the memory 404 and executed by the processor 402. The random access module 408 may be used for various aspects of the present disclosure. For example, the random access module 408 is configured to synchronize to a BS (e.g., the BSs 105) in a network (e.g., the network 100), initiate network access, and/or perform random access power control based on different channel characteristics in UL and DL frequency spectrums (e.g., the spectrums 206 and 208), as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the random access module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of random access signals for initial network attachment according to embodiments of the present disclosure. The antennas 416 may further receive data messages transmitted from other devices. This may include, for example, reception of discovery signals such as PSSs, SSSs, PBCH signals, discovery reference signals, and/or SSBs according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
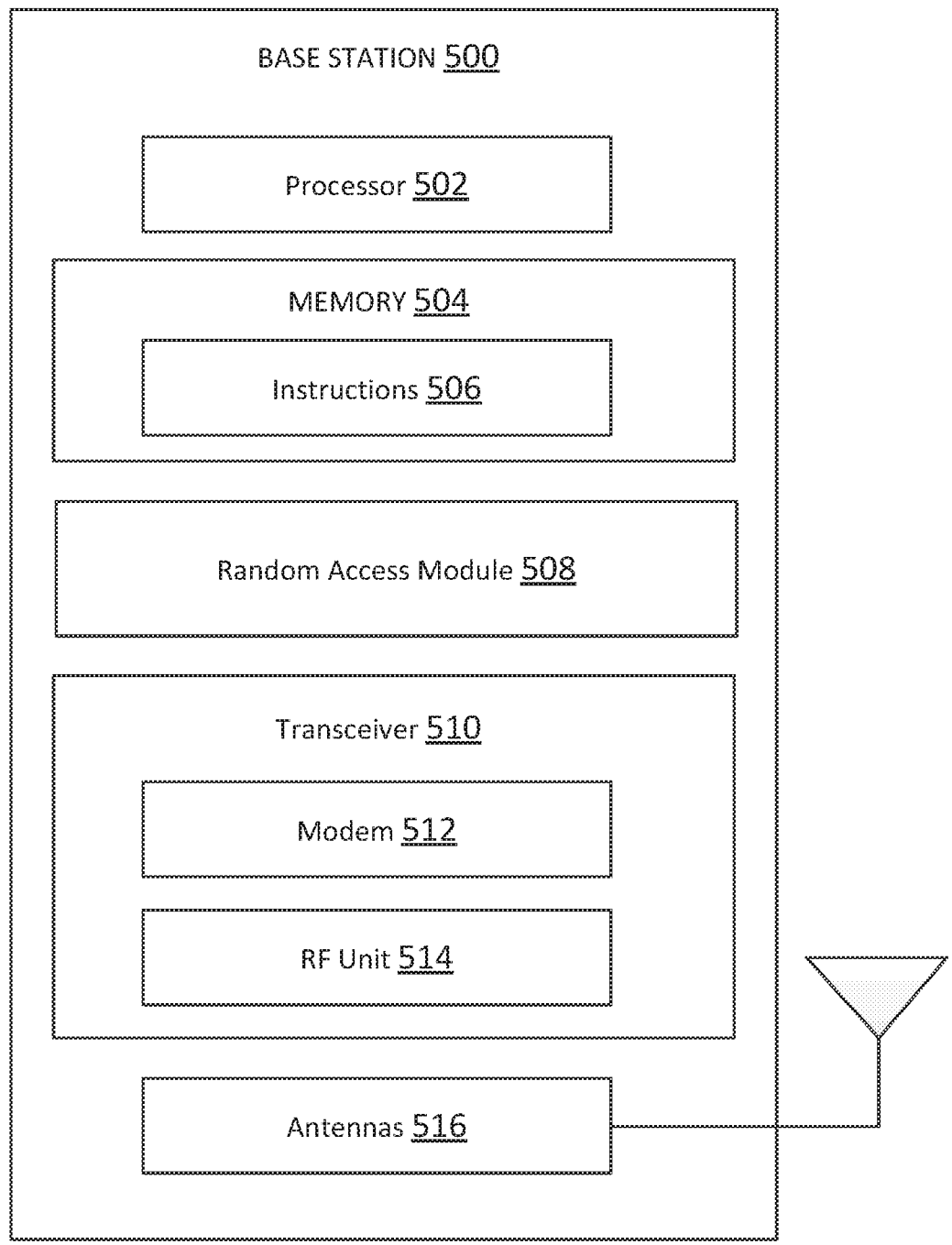
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a random access module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The random access module 508 may be implemented via hardware, software, or combinations thereof. For example, the random access module 508 may be implemented as a processor, circuit, and/or instructions 506 stored in the memory 504 and executed by the processor 502. The random access module 508 may be used for various aspects of the present disclosure. For example, the random access module 508 is configured to transmit SSBs including PRACH configurations to facilitate initial network access in a network (e.g., the network 100) using cross-band DL/UL pairing (e.g., as shown in the scenario 200), as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming and/or digital beamforming for directional signal transmissions and/or receptions. In some embodiments, the transceiver 510 may include antenna array elements and/or transceiver components (e.g., power amplifiers) that can be switched on or off to form a beam in a particular direction. Alternatively, the transceiver 510 may include multiple transmit/receive chains and may switch between the multiple transmit/receive chains to form a beam in a particular direction. In some embodiments, the antenna array elements may be different or configured differently for UL and DL paths. Thus, UL and DL may have different antenna array gains. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
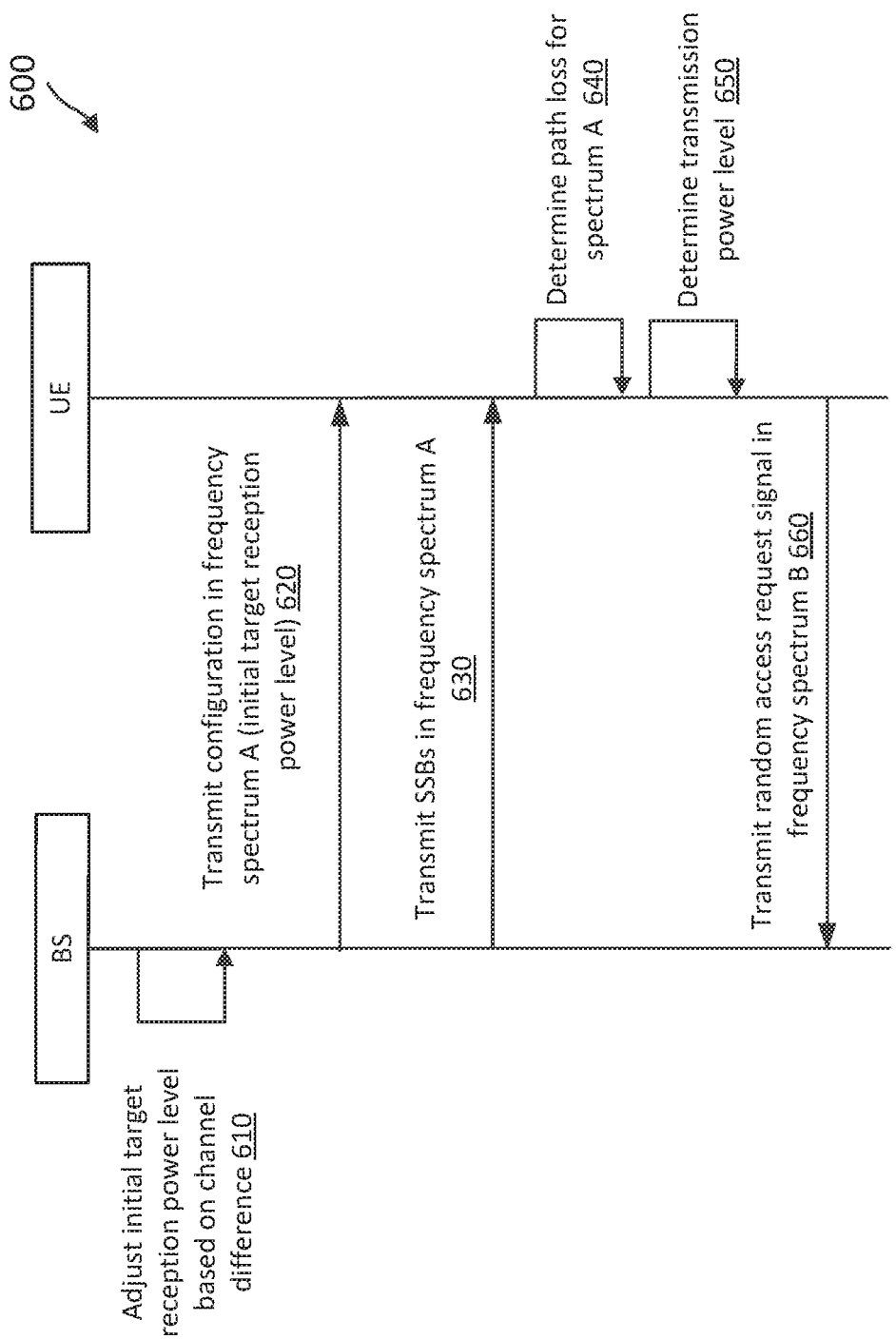
FIG. 6 illustrates a signaling diagram of a random access method with a power adjustment for cross-band DL/UL pairing according to embodiments of the present disclosure.

FIG. 6 illustrates a signaling diagram of a random access method 600 with a power adjustment for cross-band DL/UL pairing according to embodiments of the present disclosure. The method 600 may be implemented between a BS such as the BS 105 and 500 and a UE such as the UEs 115 and 400. The method 600 may use similar random access mechanisms as described in the method 300 with respect to FIG. 3. The method 600 provides a more detailed view of the mechanisms for a BS to account for channel characteristic differences between a UL band (e.g., the frequency spectrum B 206) and a DL band (e.g., the frequency spectrum A 208) when using cross-band DL/UL pairing as shown in the scenario 200. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS and one UE for purposes of simplicity of discussion, though it will be recognized that embodiments of the present disclosure may scale to many more UEs and/or BSs.

In the method 600, the BS communicates DL communications (e.g., the DL communications 220) with the UE in a frequency spectrum A (e.g., the frequency spectrum A 208) and communicates UL communications (e.g., the UL communications 210) with the UE in a frequency spectrum B (e.g., the frequency spectrum B 206).

At step 610, the BS adjusts an initial target reception power for initial random access. For example, the BS may determine an initial target reception power of a random access signal desired at the BS. The BS may determine a power adjustment for the initial target reception power based on channel characteristic differences between the frequency spectrum A and the frequency spectrum B.

For example, the BS may adjust the initial target reception power by a penetration loss difference between the frequency spectrum A and the frequency spectrum B, a path loss difference between the frequency spectrum A and the frequency spectrum B, an antenna array gain difference between communications in the frequency spectrum A and the frequency spectrum B, and/or any other parameters related to channel path differences. Penetration loss may refer to the signal level attenuation or fading caused by an obstruction (e.g., a wall or a building). Path loss may refer to the signal level attenuation caused by free-space propagation, reflection, diffraction, scattering, and/or absorption (e.g., penetration). Path loss may include a factor dependent on the carrier or center frequency of a transmission (e.g., between a mmWav frequency and a sub-6 GHz frequency). Antenna array gain may refer to the power gain of a transmitted signal using multiple antennas. For example, the BS may employ different antenna array elements (e.g., elements in the transceiver 510) or configure antenna array elements differently for UL and DL communications. In an embodiment, the BS may compute the power adjustment as shown below:

$$\text{Adjustment} = P_{delta\_e} + 20 \times \log_{10}(f_{UL}/f_{DL}) + AG_{delta} \quad (1)$$

where $P_{delta\_e}$ represents the penetration loss difference between the frequency spectrum A and the frequency spectrum B based on a nominal UL transmission and a nominal DL transmission, $20 \times \log_{10}(f_{UL}/f_{DL})$ represents the frequency dependency factor contributing to the path loss difference between the frequency spectrum A and the frequency spectrum B, $f_{DL}$ represents the center frequency of the frequency spectrum A, $f_{UL}$ represents the center frequency of the frequency spectrum B, and $AG_{delta}$ represents the antenna array gain difference used for UL and DL communications. The BS may adjust the initial target reception power level by adding the adjustment to the initial target reception power level.

At step 620, the BS transmits a configuration in the frequency spectrum A. The configuration may indicate the initial target reception power level including the adjustment shown in Equation (1).

At step 630, the BS transmits SSBs or DL broadcast signals in the frequency spectrum A, for example, in different beam directions. The SSBs or the DL broadcast signals may include information indicating transmission power level used by the BS to transmit the SSBs or the DL broadcast signals. In some embodiments, the configuration in the step 620 may be included in system information carried in a PBCH signal within an SSB.

At step 640, the UE determines a path loss for the spectrum A based on a difference between a reception power of a selected SSB at the UE and an SSB transmission power level used by the BS. At step 650, the UE determines a transmission power level for transmitting a random access request signal based on the determined path loss. For example, the UE may compute the transmission power level as shown below:

$$P_{PRACH} = \min\{P_{CMAX}, P_{target} + P_L\} \quad (2)$$

where $P_{PRACH}$ represents the random access transmission power level, min represents a minimum operator, $P_{CMAX}$ represents the maximum transmit power level allowable at the UE, $P_{target}$ represents the initial target reception power level at the BS, and $P_L$ represents the path loss in the frequency spectrum A.

At step 660, the UE transmits a random access request signal in the frequency spectrum B using the determined random access transmission power level shown in Equation (2). Subsequently, the BS and the UE may exchange a random access response, a connection request, and a connection response to complete the initial channel access as shown in the method 300.

As can be seen in the method 600, the BS includes the adjustment in the initial target reception power level transmitted to the UE. Thus, the channel characteristic difference may be transparent to the UE, where the random access transmission power level may be computed as shown in Equation (2) without an additional power adjustment offset.

Figure 7:
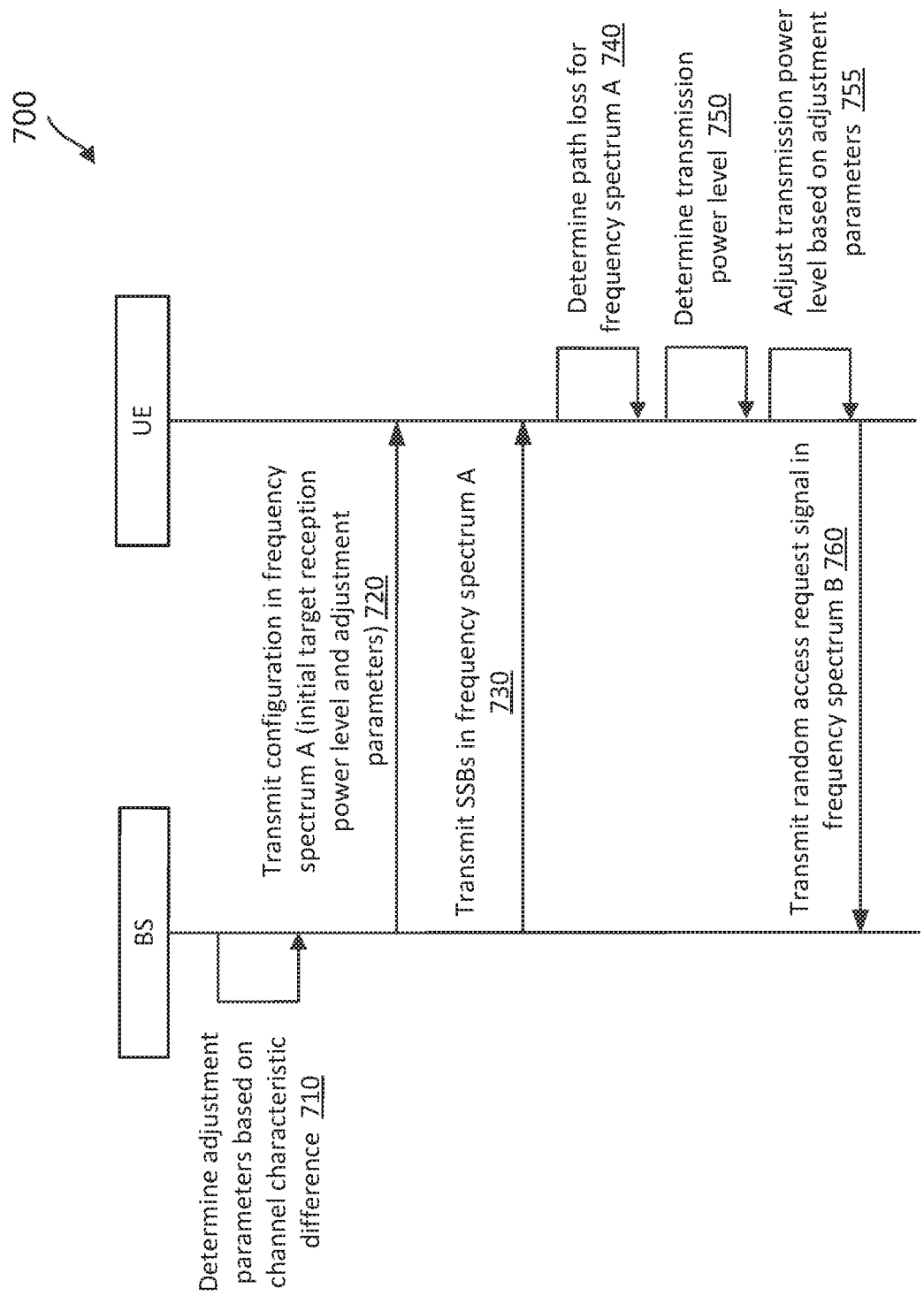
FIG. 7 illustrates a signaling diagram of a random access method with a power adjustment for cross-band DL/UL pairing according to embodiments of the present disclosure.

FIG. 7 illustrates a signaling diagram of a random access method 700 with a power adjustment for cross-band DL/UL pairing according to embodiments of the present disclosure. The method 700 may be implemented between a BS such as the BS 105 and 500 and a UE such as the UEs 115 and 400. The method 700 may be similar to method 600, but the UE may account for channel characteristic differences between a UL band (e.g., the frequency spectrum B 206) and a DL band (e.g., the frequency spectrum A 208) when using cross-band DL/UL pairing as shown in the scenario 200 instead of the BS. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates one BS and one UE for purposes of simplicity of discussion, though it will be recognized that embodiments of the present disclosure may scale to many more UEs and/or BSs.

Similar to the method 600, the BS communicates DL communications (e.g., the DL communications 220) with the UE in a frequency spectrum A (e.g., the frequency spectrum A 208) and communicates UL communications (e.g., the UL communications 210) with the UE in a frequency spectrum B (e.g., the frequency spectrum B 206).

At step 710, the BS determines adjustment parameters for random access power control at the UE based on channel characteristic differences between the frequency spectrum A and the frequency spectrum B. For example, the BS may determine a penetration loss adjustment parameter based on the penetration loss difference between the frequency spectrum A and the frequency spectrum B. In addition, the BS may determine an antenna array gain adjustment parameter based on the different antenna array gains at the BS's transmitter and the BS's receiver. The BS may further determine other parameters associated with the different channel paths between a DL communication (e.g., the DL communications 220) and a UL communication (e.g., the UL communications 210).

At step 720, the BS transmits a configuration in the frequency spectrum A. The configuration may indicate the penetration loss adjustment parameter, the antenna array gain adjustment parameter, and/or an initial target random access reception power level at the BS.

At step 730, the BS transmits SSBs or DL broadcast signals in the frequency spectrum A, for example, in different beam directions. The SSBs or the DL broadcast signals may indicate a transmission power level used by the BS to transmit the SSBs or the DL broadcast signals. In some embodiments, the configuration in the step 720 may be included in a PBCH signal or a system information block (SIB).

At step 740, the UE determines a path loss for the spectrum A based on a difference between a reception power of a selected SSB at the UE and an SSB transmission power level used by the BS. At step 750, the UE determines a transmission power level for transmitting a random access request signal based on the determined path loss. At step 755, the UE adjusts the transmission power level based on the adjustment parameters. For example, the UE may compute the transmission power level as shown below:

$$P_{RACH} = \min\{P_{CMAX}, P_{target} + P_{delta\_e} + 20 \times \log_{10}(f_{UL}/f_{DL}) + AG_{delta} + P_L\} \quad (3)$$

At step 760, the UE transmits a random access signal in the frequency spectrum B using the determined random access transmission power level shown in Equation (3). Subsequently, the BS and the UE may exchange a random access response, a connection request, and a connection response to complete the initial channel access as shown in the method 300.

As can be seen in the method 700, the BS provides the adjustment parameters to the UE and the UE computes the random access transmission power level by incorporating the adjustment parameters. While the methods 600 and 700 account for the channel characteristic differences between the frequency spectrum A and the frequency spectrum B, the penetration loss difference is based on nominal DL and nominal UL transmissions and the antenna array gain difference is based on estimates of the BS. The UE may experience a different penetration loss and/or a different antenna array gain as estimated by the BS. Thus, the adjustment parameters may not be sufficient or accurate in representing the channel characteristic differences between the frequency spectrum A and the frequency spectrum B.

Figure 8:
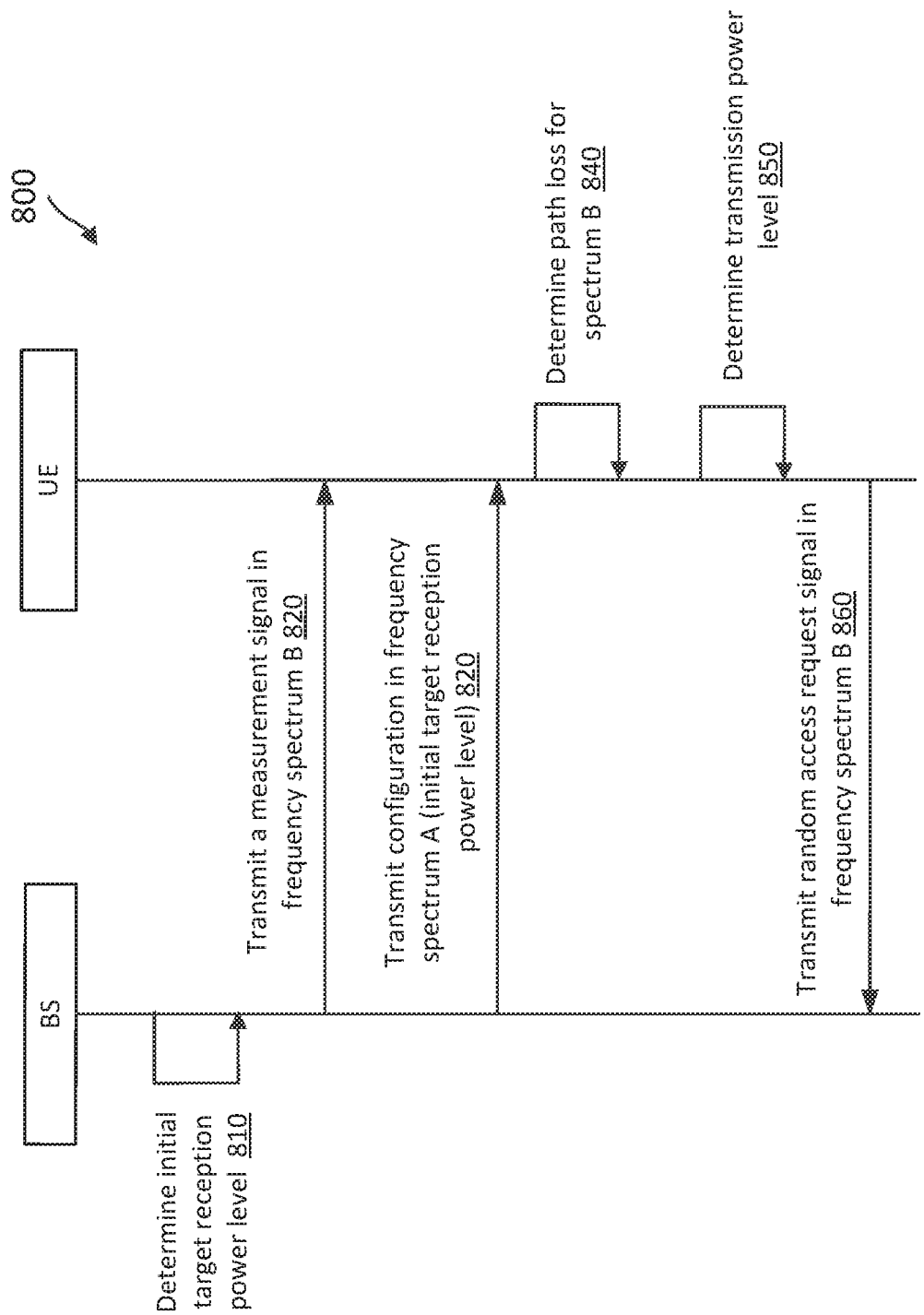
FIG. 8 illustrates a signaling diagram of a random access method with additional DL transmissions in an uplink (UL) band to facilitate cross-band DL/UL pairing according to embodiments of the present disclosure.

FIG. 8 illustrates a signaling diagram of a random channel access method 800 with additional DL transmissions in a UL band to facilitate cross-band DL/UL pairing according to embodiments of the present disclosure. The method 800 may be implemented between a BS such as the BS 105 and 500 and a UE such as the UEs 115 and 400. The method 800 may use similar random access mechanisms as described in the method 300 with respect to FIG. 3, but the BS may additionally transmit communication signals in a UL frequency band (e.g., the frequency spectrum B 206) to allow the UE to measure channel characteristics in the UL frequency band for random access power control when using cross-band DL/UL pairing as shown in the scenario 200. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates one BS and one UE for purposes of simplicity of discussion, though it will be recognized that embodiments of the present disclosure may scale to many more UEs and/or BSs.

Similar to the methods 600 and 700, the BS communicates DL communications (e.g., the DL communications 220) with the UE in a frequency spectrum A (e.g., the frequency spectrum A 208) and communicates UL communications (e.g., the UL communications 210) with the UE in a frequency spectrum B (e.g., the frequency spectrum B 206). In addition, the BS transmits measurement signals in the frequency spectrum B.

At step 810, the BS determines an initial target reception power of a random access signal desired at the BS.

At step 820, the BS transmits a measurement signal in the frequency spectrum B to allow the UE to determine channel characteristics in the frequency spectrum B. The measurement signal may include an SSB or any suitable reference signal (e.g., including a predetermined sequence) that may facilitate channel measurements. The BS may transmit the measurement signal repeatedly with a large periodicity (e.g., at about every 10 ms, 20 ms, 40 ms, 80 ms, or 100 ms). The BS may transmit the measurement signal using FDM and/or TDM with the UL communications.

At step 830, the BS transmits a configuration in the frequency spectrum A. The configuration may indicate an initial target random access reception power level at the BS. The configuration may additionally indicate a transmission power level used for transmitting the measurement signal. In some embodiments, the BS may transmit SSBs or DL broadcast signals including the configuration.

At step 840, the UE determines a path loss for the frequency spectrum B based on a difference between a reception power of the measurement signal at the UE and the transmission power level of the measurement signal indicated in the configuration.

At step 850, the UE determines a transmission power level for transmitting a random access request signal in the frequency spectrum B based on the determined path loss. For example, the UE may compute the transmission power level as shown above in Equation (2).

At step 860, the UE transmits a random access signal in the frequency spectrum B using the transmission power level determined in the step 850. Subsequently, the BS and the UE may exchange a random access response, a connection request, and a connection response to complete the initial channel access as shown in the method 300.

Since the UE can estimate the channel response of the frequency spectrum B based on a signal received from the frequency spectrum B instead of based on adjustment parameters estimated by the BS, the method 800 may allow for more accurate random access transmission power determinations and improve random access performance. However, in the method 800, the BS is required to additionally support transmit capability in the frequency spectrum B and the UE is required to additionally support receive capability in the frequency spectrum B.

Figure 9:
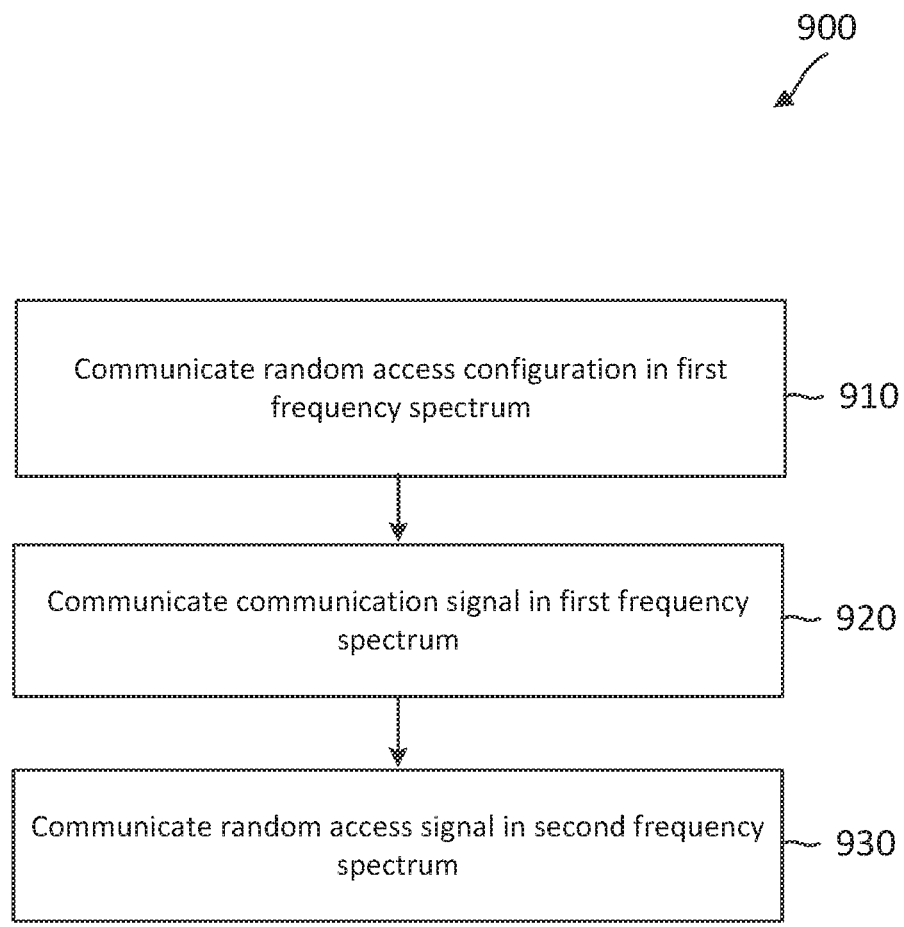
FIG. 9 is a flow diagram of a random access method with a power adjustment for cross-band DL/UL pairing according to embodiments of the present disclosure.

FIG. 9 is a flow diagram of a random access method 900 with a power adjustment for cross-band DL/UL pairing according to embodiments of the present disclosure. Steps of the method 900 can be executed by a computing device (e.g., a processor, processing circuit, and/or other suitable component) of a wireless communication device, such as the BSs 105 and 500 and the UEs 115 and 400. The method 900 may employ similar mechanisms as in the scenario 200 and the methods 300, 600, and 700 as described with respect to FIGS. 2, 3, 6, and 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device, a random access configuration in a first frequency spectrum. The random access configuration may include information associated with a channel characteristic difference between the first frequency spectrum and a second frequency spectrum. The first frequency spectrum may be similar to the frequency spectrum A 208 located at a mmWav band 204. The second frequency spectrum may be similar to the frequency spectrum B 206 located at a non-mmWav band 202 (e.g., a sub-6 GHz band). In general, the first frequency spectrum may be located at higher frequencies than the second frequency spectrum. For example, the first frequency spectrum can be in a frequency range between about 1-2 GHz, about 2-3 GHz, about 3-4 GHz, about 4-5 GHz, or about 5-6 GHz, and the second frequency spectrum can be in a frequency range between about 600-700 MHz, about 700-800 MHz, or about 800-900 MHz. The channel characteristic difference may include a penetration loss difference between the first frequency spectrum and the second frequency spectrum, a path loss difference between the first frequency spectrum and the second frequency spectrum, and/or an antenna array gain difference between communications in the first frequency spectrum and the second frequency spectrum.

At step 920, the method 900 includes communicating, by the first wireless communication device with the second wireless communication device, a communication signal in the first frequency spectrum. The communication signal may be an SSB signal. The communication signal may indicate a transmission power level of the communication signal. In some embodiments, the communication signal may include an SSB signal or a PBCH signal or a SIB including the random access configuration.

At step 930, the method 900 includes communicating, by the first wireless communication device with the second wireless communication device, a random access signal in the second frequency spectrum based on the communication signal and the random access configuration. The random access signal may include a random access preamble sequence.

In an embodiment, the first wireless communication device may correspond to a BS and the second wireless communication device may correspond to a UE. In such an embodiment, the first wireless communication device may transmit the random access configuration and the communication signal to the second wireless communication device and may receive the random access signal from the second wireless communication device. In one embodiment, the first wireless communication device may determine a target reception power level of the random access signal at the first wireless communication device and adjusts the target reception power level according to Equation (1) as shown in the method 600. The random access configuration may indicate the adjusted target reception power level. In another embodiment, the first wireless communication device may determine an adjustment parameter for power control at the second wireless communication device based on the channel characteristic difference and indicate the adjustment parameter in the random access configuration as shown in the method 700.

In another embodiment, the first wireless communication device may correspond to a UE and the second wireless communication device may correspond to a BS. In such an embodiment, the first wireless communication device may receive the random access configuration and the communication signal from the second wireless communication device and may transmit the random access signal to the second wireless communication device. In one embodiment, the random access configuration may indicate a target reception power level at the second wireless communication device and the first wireless communication device may determine a transmission power level for transmitting the random access signal based on a path loss in the first frequency spectrum (e.g., computed based on a reception power of the communication signal and the transmission power level of the communication signal) and the target reception power level. In some embodiments, the random access configuration may further indicate an adjustment parameter for the channel characteristic difference. In such embodiments, the first wireless communication device may determine the transmission power level further based on the adjustment parameter according to Equation (3) as shown in the method 700.

Figure 10:
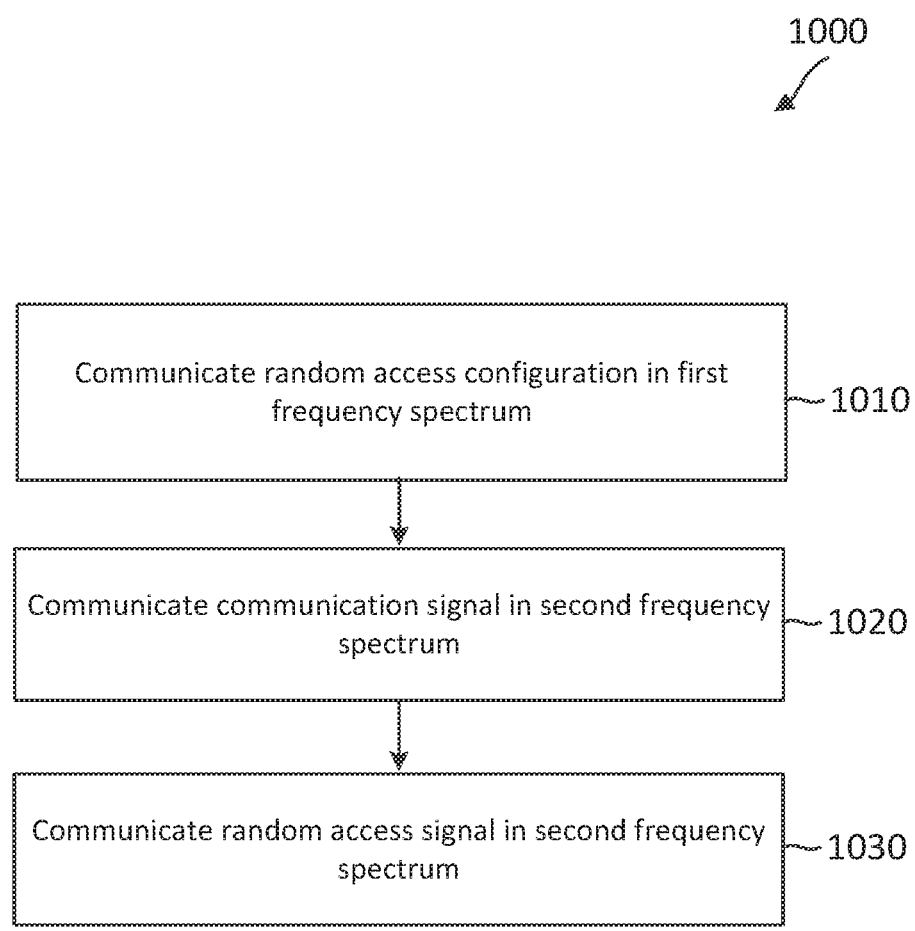
FIG. 10 is a flow diagram of a random access method with additional DL transmissions in a UL band to facilitate cross-band DL/UL pairing according to embodiments of the present disclosure.

FIG. 10 is a flow diagram of a random access method 1000 with additional DL transmissions in a UL band to facilitate cross-band DL/UL pairing according to embodiments of the present disclosure. Steps of the method 1000 can be executed by a computing device (e.g., a processor, processing circuit, and/or other suitable component) of a wireless communication device, such as the BSs 105 and 500 and the UEs 115 and 400. The method 1000 may employ similar mechanisms as in the scenario 200 and the methods 300 and 800 as described with respect to FIGS. 2, 3, and 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes communicating, by a first wireless communication device with a second wireless communication device, a random access configuration in a first frequency spectrum. The first frequency spectrum may be similar to the frequency spectrum A 208 located at a mmWav band 204.

At step 1020, the method 1000 includes communicating, by the first wireless communication device with the second wireless communication device, a communication signal in a second frequency spectrum. The communication signal may be an SSB signal. In some embodiments, the communication signal may include an SSB signal or a measurement reference signal. The second frequency spectrum may be similar to the frequency spectrum B 206 located at a non-mmWav band 202 (e.g., a sub-6 GHz band). The random access configuration may indicate a transmission power level of the communication signal communicated in the second frequency spectrum.

At step 1030, the method 1000 includes communicating, by the first wireless communication device with the second wireless communication device, a random access signal in the second frequency spectrum based on the communication signal and the random access configuration. The random access signal may include a random access preamble sequence.

In an embodiment, the first wireless communication device may correspond to a BS and the second wireless communication device may correspond to a UE. In such an embodiment, the first wireless communication device may transmit the random access configuration and the communication signal to the second wireless communication device and may receive the random access signal from the second wireless communication device. The random access configuration may further indicate a target reception power level of the random access signal at the first wireless communication device.

In an embodiment, the first wireless communication device may correspond to a UE and the second wireless communication device may correspond to a BS. In such an embodiment, the first wireless communication device may receive the random access configuration and the communication signal from the second wireless communication device and may transmit the random access signal to the second wireless communication device. The random access configuration may further indicate a target reception power level of the random access signal at the second wireless communication device. The first wireless communication device may determine a transmission power level for transmitting the random access signal based on the target reception power level for the random access signal, the reception power of the communication signal measured at the first wireless communication device, and the transmission power level of the communication signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising communicating, by a first wireless communication device with a second wireless communication device, a random access configuration including information associated with a channel characteristic difference between a first frequency spectrum and a second frequency spectrum, the random access configuration communicated in the first frequency spectrum; and communicating, by the first wireless communication device with the second wireless communication device, a random access signal in the second frequency spectrum based on the random access configuration.

In some embodiments, wherein the channel characteristic difference includes at least one of a penetration loss difference between the first frequency spectrum and the second frequency spectrum, a path loss difference between the first frequency spectrum and the second frequency spectrum, or an antenna array gain difference between communications in the first frequency spectrum and the second frequency spectrum. In some embodiments, wherein the communicating the random access configuration includes transmitting, by the first wireless communication device to the second wireless communication device, the random access configuration, and wherein the communicating the random access signal includes receiving, by the first wireless communication device from the second wireless communication device, the random access signal. In some embodiments, the method further comprises determining, by the first wireless communication device, a target reception power level of the random access signal at the first wireless communication device based on the channel characteristic difference, wherein the random access configuration indicates the target reception power level. In some embodiments, the method further comprises determining, by the first wireless communication device, an adjustment parameter for power control at the second wireless communication device based on the channel characteristic difference, wherein the random access configuration indicates at least the adjustment parameter. In some embodiments, wherein the communicating the random access configuration includes receiving, by the first wireless communication device from the second wireless communication device, the random access configuration, and wherein the communicating the random access signal includes transmitting, by the first wireless communication device to the second wireless communication device, the random access signal at a transmission power level based on the random access configuration. In some embodiments, wherein the random access configuration indicates a target reception power level at the second wireless communication device, and wherein the method further comprises determining, by the first wireless communication device, the transmission power level based on at least the target reception power level. In some embodiments, wherein the random access configuration further indicates an adjustment parameter for the channel characteristic difference, and wherein the determining is further based on the adjustment parameter. In some embodiments, the method further comprises communicating, by the first wireless communication device with the second wireless communication device, a random access response in the first frequency spectrum in response to the random access signal; communicating, by the first wireless communication device with the second wireless communication device, a connection request in the second frequency spectrum in response to the random access response; and communicating, by the first wireless communication device with the second wireless communication device, a connection response in the first frequency spectrum in response to the connection request. In some embodiments, the method further comprises communicating, by the first wireless communication device with the second wireless communication device, a first communication signal on a first subcarrier spacing in the first frequency spectrum; and communicating, by the first wireless communication device with the second wireless communication device, a second communication signal based on a second subcarrier spacing in the second frequency spectrum, wherein the first subcarrier spacing and the second subcarrier spacing are different. In some embodiments, wherein the first frequency spectrum is at a millimeter wave band. In some embodiments, wherein the second frequency spectrum is at a non-millimeter wave band.

Embodiments of the present disclosure include a method of wireless communication, comprising communicating, by a first wireless communication device with a second wireless communication device, a random access configuration for a first frequency spectrum, the random access configuration communicated in a second frequency spectrum different from first frequency spectrum; communicating, by the first wireless communication device with the second wireless communication device, a communication signal in the first frequency spectrum based on the random access configuration; and communicating, by the first wireless communication device with the second wireless communication device, a random access signal in the first frequency spectrum based on the communication signal.

In some embodiments, wherein the random access configuration indicates at least a transmission power level of the communication signal, and wherein the communication signal includes at least one of a synchronization signal or a reference signal. In some embodiments, wherein the communicating the random access configuration includes transmitting, by the first wireless communication device to the second wireless communication device, the random access configuration; the communicating the communication signal includes transmitting, by the first wireless communication device to the second wireless communication device, the communication signal based on the transmission power level; and the communicating the random access signal includes receiving, by the first wireless communication device from the second wireless communication device, the random access signal. In some embodiments, wherein the communicating the random access configuration includes receiving, by the first wireless communication device from the second wireless communication device, the random access configuration; the communicating the communication signal includes receiving, by the first wireless communication device from the second wireless communication device, the communication signal; and the communicating the random access signal includes transmitting, by the first wireless communication device to the second wireless communication device, the random access signal based on a transmission power level determined based on at least a reception power of the communication signal at the first wireless communication device and the transmission power level of the communication signal.

Embodiments of the present disclosure include an apparatus comprising a transceiver configured to communicate, with a second wireless communication device, a random access configuration including information associated with a channel characteristic difference between a first frequency spectrum and a second frequency spectrum, the random access configuration communicated in the first frequency spectrum; and communicate, with the second wireless communication device, a random access signal in the second frequency spectrum based on the random access configuration.

In some embodiments, wherein the channel characteristic difference includes at least one of a penetration loss difference between the first frequency spectrum and the second frequency spectrum, a path loss difference between the first frequency spectrum and the second frequency spectrum, or an antenna array gain difference between communications in the first frequency spectrum and the second frequency spectrum. In some embodiments, wherein the transceiver is further configured to communicate the random access configuration by transmitting, to the second wireless communication device, the random access configuration; and communicate the random access signal by receiving, from the second wireless communication device, the random access signal. In some embodiments, the apparatus further comprises a processor configured to determine a target reception power level of the random access signal at the apparatus based on the channel characteristic difference, wherein the random access configuration indicates the target reception power level. In some embodiments, the apparatus further comprises a processor configured to determine an adjustment parameter for power control at the second wireless communication device based on the channel characteristic difference, wherein the random access configuration indicates at least the adjustment parameter. In some embodiments, wherein the transceiver is further configured to communicate the random access configuration by receiving, from the second wireless communication device, the random access configuration; and communicate the random access signal by transmitting, to the second wireless communication device, the random access signal at a transmission power level based on the random access configuration. In some embodiments, wherein the random access configuration indicates a target reception power level at the second wireless communication device, and wherein the apparatus further comprises a processor configured to determine the transmission power level based on at least the target reception power level. In some embodiments, wherein the random access configuration further indicates an adjustment parameter for the channel characteristic difference, and wherein the processor is further configured to determine the transmission power level further based on the adjustment parameter. In some embodiments, wherein the transceiver is further configured to communicate, with the second wireless communication device, a random access response in the first frequency spectrum in response to the random access signal; communicate, with the second wireless communication device, a connection request in the second frequency spectrum in response to the random access response; and communicate, with the second wireless communication device, a connection response in the first frequency spectrum in response to the connection request. In some embodiments, wherein the transceiver is further configured to communicate, with the second wireless communication device, a first communication signal on a first subcarrier spacing in the first frequency spectrum; and communicate, with the second wireless communication device, a second communication signal based on a second subcarrier spacing in the second frequency spectrum, wherein the first subcarrier spacing and the second subcarrier spacing are different. In some embodiments, wherein the first frequency spectrum is at a millimeter wave band. In some embodiments, wherein the second frequency spectrum is at a non-millimeter wave band.

Embodiments of the present disclosure include an apparatus comprising a transceiver configured to communicate, with a second wireless communication device, a random access configuration for a first frequency spectrum, the random access configuration communicated in a second frequency spectrum different from first frequency spectrum; communicate, with the second wireless communication device, a communication signal in the first frequency spectrum based on the random access configuration; and communicate, with the second wireless communication device, a random access signal in the first frequency spectrum based on the communication signal.

In some embodiments, wherein the random access configuration indicates at least a transmission power level of the communication signal, and wherein the communication signal includes at least one of a synchronization signal or a reference signal. In some embodiments, wherein the transceiver is further configured to communicate the random access configuration by transmitting, to the second wireless communication device, the random access configuration; communicate the communication signal by transmitting, to the second wireless communication device, the communication signal based on the transmission power level; and communicate the random access signal by receiving, from the second wireless communication device, the random access signal. In some embodiments, wherein the transceiver is further configured to communicate the random access configuration by receiving, from the second wireless communication device, the random access configuration; communicate the communication signal by receiving, from the second wireless communication device, the communication signal; and communicate the random access signal by transmitting, to the second wireless communication device, the random access signal based on a transmission power level determined based on at least a reception power of the communication signal at the apparatus and the transmission power level of the communication signal.

Embodiments of the present disclosure include a computer-readable medium having program code recorded thereon, the program code comprising code for causing a first wireless communication device to communicate, with a second wireless communication device, a random access configuration including information associated with a channel characteristic difference between a first frequency spectrum and a second frequency spectrum, the random access configuration communicated in the first frequency spectrum; and code for causing the first wireless communication device to communicate, with the second wireless communication device, a random access signal in the second frequency spectrum based on the random access configuration.

In some embodiments, wherein the channel characteristic difference includes at least one of a penetration loss difference between the first frequency spectrum and the second frequency spectrum, a path loss difference between the first frequency spectrum and the second frequency spectrum, or an antenna array gain difference between communications in the first frequency spectrum and the second frequency spectrum. In some embodiments, wherein the code for causing the first wireless communication device to communicate the random access configuration is further configured to transmit, to the second wireless communication device, the random access configuration, and wherein the code for causing the first wireless communication device to communicate the random access signal is further configured to receive, from the second wireless communication device, the random access signal. In some embodiments, the computer-readable medium further comprises code for causing the first wireless communication device to determine a target reception power level of the random access signal at the first wireless communication device based on the channel characteristic difference, wherein the random access configuration indicates the target reception power level. In some embodiments, the computer-readable medium further comprises code for causing the first wireless communication device to determine an adjustment parameter for power control at the second wireless communication device based on the channel characteristic difference, wherein the random access configuration indicates at least the adjustment parameter. In some embodiments, wherein the code for causing the first wireless communication device to communicate the random access configuration is further configured to receive, from the second wireless communication device, the random access configuration, and wherein the code for causing the first wireless communication device to communicate the random access signal is further configured to transmit, to the second wireless communication device, the random access signal at a transmission power level based on the random access configuration. In some embodiments, wherein the random access configuration indicates a target reception power level at the second wireless communication device, and wherein the computer-readable medium further comprises code for causing the first wireless communication device to determine the transmission power level based on at least the target reception power level. In some embodiments, wherein the random access configuration further indicates an adjustment parameter for the channel characteristic difference, and wherein the code for causing the first wireless communication device to determine the transmission power level is further configured to determine the transmission power level further based on the adjustment parameter. In some embodiments, the computer-readable medium further comprises code for causing the first wireless communication device to communicate, with the second wireless communication device, a random access response in the first frequency spectrum in response to the random access signal; code for causing the first wireless communication device to communicate, with the second wireless communication device, a connection request in the second frequency spectrum in response to the random access response; and code for causing the first wireless communication device to communicate, with the second wireless communication device, a connection response in the first frequency spectrum in response to the connection request. In some embodiments, the computer-readable medium further comprises code for causing the first wireless communication device to communicate, with the second wireless communication device, a first communication signal on a first subcarrier spacing in the first frequency spectrum; and code for causing the first wireless communication device to communicate, with the second wireless communication device, a second communication signal based on a second subcarrier spacing in the second frequency spectrum, wherein the first subcarrier spacing and the second subcarrier spacing are different. In some embodiments, wherein the first frequency spectrum is at a millimeter wave band. In some embodiments, wherein the second frequency spectrum is at a non-millimeter wave band.

Embodiments of the present disclosure include a computer-readable medium having program code recorded thereon, the program code comprising code for causing a first wireless communication device to communicate, with a second wireless communication device, a random access configuration for a first frequency spectrum, the random access configuration communicated in a second frequency spectrum different from first frequency spectrum; code for causing the first wireless communication device to communicate, with the second wireless communication device, a communication signal in the first frequency spectrum based on the random access configuration; and code for causing the first wireless communication device to communicate, with the second wireless communication device, a random access signal in the first frequency spectrum based on the communication signal.

In some embodiments, wherein the random access configuration indicates at least a transmission power level of the communication signal, and wherein the communication signal includes at least one of a synchronization signal or a reference signal. In some embodiments, wherein the code for causing the first wireless communication device to communicate the random access configuration is further configured to transmit, to the second wireless communication device, the random access configuration; the code for causing the first wireless communication device to communicate the communication signal is further configured to transmit, to the second wireless communication device, the communication signal based on the transmission power level; and the code for causing the first wireless communication device to communicate the random access signal is further configured to receive, from the second wireless communication device, the random access signal. In some embodiments, wherein the code for causing the first wireless communication device to communicate the random access configuration is further configured to receive, from the second wireless communication device, the random access configuration; the code for causing the first wireless communication device to communicate the communication signal is further configured to receive, from the second wireless communication device, the communication signal; and the code for causing the first wireless communication device to communicating the random access signal is further configured to transmit, to the second wireless communication device, the random access signal based on a transmission power level determined based on at least a reception power of the communication signal at the first wireless communication device and the transmission power level of the communication signal.

Embodiments of the present disclosure include an apparatus comprising means for communicating, with a second wireless communication device, a random access configuration including information associated with a channel characteristic difference between a first frequency spectrum and a second frequency spectrum, the random access configuration communicated in the first frequency spectrum; and means for communicating, with the second wireless communication device, a random access signal in the second frequency spectrum based on the random access configuration.

In some embodiments, wherein the channel characteristic difference includes at least one of a penetration loss difference between the first frequency spectrum and the second frequency spectrum, a path loss difference between the first frequency spectrum and the second frequency spectrum, or an antenna array gain difference between communications in the first frequency spectrum and the second frequency spectrum. In some embodiments, wherein the means for communicating the random access configuration is further configured to transmit, to the second wireless communication device, the random access configuration, and wherein the means for communicating the random access signal is further configured to receive, from the second wireless communication device, the random access signal. In some embodiments, the apparatus further comprises means for determining a target reception power level of the random access signal at the apparatus based on the channel characteristic difference, wherein the random access configuration indicates the target reception power level. In some embodiments, the apparatus further comprises means for determining an adjustment parameter for power control at the second wireless communication device based on the channel characteristic difference, wherein the random access configuration indicates at least the adjustment parameter. In some embodiments, wherein the means for communicating the random access configuration is further configured to receive, from the second wireless communication device, the random access configuration, and wherein the means for communicating the random access signal is further configured to transmit, to the second wireless communication device, the random access signal at a transmission power level based on the random access configuration. In some embodiments, wherein the random access configuration indicates a target reception power level at the second wireless communication device, and wherein the apparatus further comprises means for determining the transmission power level based on at least the target reception power level. In some embodiments, wherein the random access configuration further indicates an adjustment parameter for the channel characteristic difference, and wherein the means for determining the transmission power level is further configured to determine the transmission power level further based on the adjustment parameter. In some embodiments, the apparatus further comprising means for communicating, with the second wireless communication device, a random access response in the first frequency spectrum in response to the random access signal; means for communicating, with the second wireless communication device, a connection request in the second frequency spectrum in response to the random access response; and means for communicating, with the second wireless communication device, a connection response in the first frequency spectrum in response to the connection request. In some embodiments, the apparatus further comprises means for communicating, with the second wireless communication device, a first communication signal on a first subcarrier spacing in the first frequency spectrum; and means for communicating, with the second wireless communication device, a second communication signal based on a second subcarrier spacing in the second frequency spectrum, wherein the first subcarrier spacing and the second subcarrier spacing are different. In some embodiments, wherein the first frequency spectrum is at a millimeter wave band. In some embodiments, wherein the second frequency spectrum is at a non-millimeter wave band.

Embodiments of the present disclosure include an apparatus comprising means for communicating, with a second wireless communication device, a random access configuration for a first frequency spectrum, the random access configuration communicated in a second frequency spectrum different from first frequency spectrum; means for communicating, with the second wireless communication device, a communication signal in the first frequency spectrum based on the random access configuration; and means for communicating, with the second wireless communication device, a random access signal in the first frequency spectrum based on the communication signal.

In some embodiments, wherein the random access configuration indicates at least a transmission power level of the communication signal, and wherein the communication signal includes at least one of a synchronization signal or a reference signal. In some embodiments, wherein the means for communicating the random access configuration is further configured to transmit, to the second wireless communication device, the random access configuration; the means for communicating the communication signal is further configured to transmit, to the second wireless communication device, the communication signal based on the transmission power level; and the means for communicating the random access signal is further configured to receive, from the second wireless communication device, the random access signal. In some embodiments, wherein the means for communicating the random access configuration is further configured to receive, from the second wireless communication device, the random access configuration; the means for communicating the communication signal is further configured to receive, from the second wireless communication device, the communication signal; and the means for communicating the random access signal is further configured to transmit, to the second wireless communication device, the random access signal based on a transmission power level determined based on at least a reception power of the communication signal at the apparatus and the transmission power level of the communication signal.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device, a random access configuration for a first frequency spectrum, the random access configuration communicated in a second frequency spectrum different from the first frequency spectrum, wherein the random access configuration includes a target reception power level for a random access signal based on channel characteristic differences between the first frequency spectrum and the second frequency spectrum;
   communicating, by the first wireless communication device with the second wireless communication device, a communication signal in the first frequency spectrum based on the random access configuration; and
   communicating, by the first wireless communication device with the second wireless communication device, the random access signal in the first frequency spectrum based on the communication signal and the target reception power level for the random access signal.

2. The method of claim 1, wherein the random access configuration indicates at least a transmission power level of the communication signal, and wherein the communication signal includes at least one of a synchronization signal or a reference signal.

3. The method of claim 2, wherein:
   the communicating the random access configuration includes transmitting, by the first wireless communication device to the second wireless communication device, the random access configuration;
   the communicating the communication signal includes transmitting, by the first wireless communication device to the second wireless communication device, the communication signal based on the transmission power level; and
   the communicating the random access signal includes receiving, by the first wireless communication device from the second wireless communication device, the random access signal.

4. The method of claim 2, wherein:
   the communicating the random access configuration includes receiving, by the first wireless communication device from the second wireless communication device, the random access configuration;
   the communicating the communication signal includes receiving, by the first wireless communication device from the second wireless communication device, the communication signal; and
   the communicating the random access signal includes transmitting, by the first wireless communication device to the second wireless communication device, the random access signal based on an additional transmission power level determined based on at least a reception power of the communication signal at the first wireless communication device and the transmission power level of the communication signal.

5. The method of claim 1, wherein:
   the communicating the random access configuration includes receiving, by the first wireless communication device from the second wireless communication device, the random access configuration;
   the communicating the communication signal includes receiving, by the first wireless communication device from the second wireless communication device, the communication signal; and
   the communicating the random access signal includes transmitting, by the first wireless communication device to the second wireless communication device, the random access signal.

6. The method of claim 1, wherein:
   the communicating the random access configuration includes transmitting, by the first wireless communication device to the second wireless communication device, the random access configuration;
   the communicating the communication signal includes transmitting, by the first wireless communication device to the second wireless communication device, the communication signal; and the communicating the random access signal includes receiving, by the first wireless communication device from the second wireless communication device, the random access signal.

7. The method of claim 1, wherein the first frequency spectrum is at a millimeter wave band, and wherein the second frequency spectrum is at a non-millimeter wave band.

8. An apparatus comprising:
a transceiver configured to:
communicate, with a second wireless communication device, a random access configuration for a first frequency spectrum, the random access configuration communicated in a second frequency spectrum different from the first frequency spectrum, wherein the random access configuration includes a target reception power level for a random access signal based on channel characteristic differences between the first frequency spectrum and the second frequency spectrum;
communicate, with the second wireless communication device, a communication signal in the first frequency spectrum based on the random access configuration; and
communicate, with the second wireless communication device, the random access signal in the first frequency spectrum based on the communication signal and the target reception power level for the random access signal.

9. The apparatus of claim 8, wherein the random access configuration indicates at least a transmission power level of the communication signal, and wherein the communication signal includes at least one of a synchronization signal or a reference signal.

10. The apparatus of claim 9, wherein the transceiver is further configured to:
communicate the random access configuration by transmitting, to the second wireless communication device, the random access configuration;
communicate the communication signal by transmitting, to the second wireless communication device, the communication signal based on the transmission power level; and
communicate the random access signal by receiving, from the second wireless communication device, the random access signal.

11. The apparatus of claim 9, wherein the transceiver is further configured to:
communicate the random access configuration by receiving, from the second wireless communication device, the random access configuration;
communicate the communication signal by receiving, from the second wireless communication device, the communication signal; and
communicate the random access signal by transmitting, to the second wireless communication device, the random access signal.

12. The apparatus of claim 8, wherein the transceiver is further configured to:
communicate the random access configuration by receiving, from the second wireless communication device, the random access configuration;
communicate the communication signal by receiving, from the second wireless communication device, the communication signal; and
communicate the random access signal by transmitting, to the second wireless communication device, the random access signal.

13. The apparatus of claim 8, wherein the transceiver is further configured to:
communicate the random access configuration by transmitting, to the second wireless communication device, the random access configuration;
communicate the communication signal by transmitting, to the second wireless communication device, the communication signal; and
communicate the random access signal by receiving, from the second wireless communication device, the random access signal.

14. The apparatus of claim 8, wherein the first frequency spectrum is at a millimeter wave band, and wherein the second frequency spectrum is at a non-millimeter wave band.

15. A non-transitory computer-readable medium having program code recorded thereon, the program code comprising:
code for causing a first wireless communication device to communicate, with a second wireless communication device, a random access configuration for a first frequency spectrum, the random access configuration communicated in a second frequency spectrum different from the first frequency spectrum, wherein the random access configuration includes a target reception power level for a random access signal based on channel characteristic differences between the first frequency spectrum and the second frequency spectrum;
code for causing the first wireless communication device to communicate, with the second wireless communication device, a communication signal in the first frequency spectrum based on the random access configuration; and
code for causing the first wireless communication device to communicate, with the second wireless communication device, the random access signal in the first frequency spectrum based on the communication signal and the target reception power level for the random access signal.

16. The non-transitory computer-readable medium of claim 15, wherein the random access configuration indicates at least a transmission power level of the communication signal, and wherein the communication signal includes at least one of a synchronization signal or a reference signal.

17. The non-transitory computer-readable medium of claim 16, wherein:
the code for causing the first wireless communication device to communicate the random access configuration is further configured to transmit, to the second wireless communication device, the random access configuration;
the code for causing the first wireless communication device to communicate the communication signal is further configured to transmit, to the second wireless communication device, the communication signal based on the transmission power level; and
the code for causing the first wireless communication device to communicate the random access signal is further configured to receive, from the second wireless communication device, the random access signal.

18. The non-transitory computer-readable medium of claim 16, wherein:
the code for causing the first wireless communication device to communicate the random access configuration is further configured to receive, from the second wireless communication device, the random access configuration;

the code for causing the first wireless communication device to communicate the communication signal is further configured to receive, from the second wireless communication device, the communication signal; and the code for causing the first wireless communication device to communicate the random access signal is further configured to transmit, to the second wireless communication device, the random access signal.

19. The non-transitory computer-readable medium of claim 15, wherein:

the code for causing the first wireless communication device to communicate the random access configuration is further configured to receive, from the second wireless communication device, the random access configuration;

the code for causing the first wireless communication device to communicate the communication signal is further configured to receive, from the second wireless communication device, the communication signal; and the code for causing the first wireless communication device to communicate the random access signal is further configured to transmit, to the second wireless communication device, the random access signal.

20. The non-transitory computer-readable medium of claim 15, wherein:

the code for causing the first wireless communication device to communicate the random access configuration is further configured to transmit, to the second wireless communication device, the random access configuration;

the code for causing the first wireless communication device to communicate the communication signal is further configured to transmit, to the second wireless communication device, the communication signal; and the code for causing the first wireless communication device to communicate the random access signal is further configured to receive, from the second wireless communication device, the random access signal.

* * * * *